United States Patent
Oberg et al.

(10) Patent No.: US 9,837,110 B1
(45) Date of Patent: *Dec. 5, 2017

(54) DIGITAL DATA DRIVEN POSITION ERROR SIGNAL FOR MAGNETIC RECORDING

(71) Applicant: Marvell International Ltd., Hamilton (BM)

(72) Inventors: Mats Oberg, San Jose, CA (US); Gregory Burd, San Jose, CA (US); Yifei Zhang, Mountain View, CA (US); Qiyue Zou, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 15/614,447

(22) Filed: Jun. 5, 2017

Related U.S. Application Data

(63) Continuation of application No. 15/089,341, filed on Apr. 1, 2016, now Pat. No. 9,672,853.

(60) Provisional application No. 62/169,400, filed on Jun. 1, 2015.

(51) Int. Cl.
G11B 5/596 (2006.01)

(52) U.S. Cl.
CPC ................ G11B 5/59611 (2013.01)

(58) Field of Classification Search
CPC ............ G11B 5/012; G11B 5/02; G11B 5/59605–5/59622
USPC .......................... 360/55, 75, 77.06
See application file for complete search history.

(56) References Cited

U.S. PATENT DOCUMENTS

| | | | |
|---|---|---|---|
| 4,556,920 A | 12/1985 | Maeda et al. | |
| 5,079,663 A | 1/1992 | Ju et al. | |
| 5,111,348 A | 5/1992 | Baba | |
| 5,331,492 A | 7/1994 | Komai et al. | |
| 5,388,014 A | 2/1995 | Brug et al. | |
| 5,555,142 A | 9/1996 | Komai et al. | |
| 6,381,088 B1 | 4/2002 | Despain et al. | |
| 6,525,897 B2 | 2/2003 | Despain et al. | |
| 7,106,549 B2 | 9/2006 | Asakura | |
| 9,147,417 B1 | 9/2015 | Wilson et al. | |
| 9,245,556 B2 | 1/2016 | Brunnett et al. | |
| 9,672,853 B1 | 6/2017 | Oberg et al. | |

OTHER PUBLICATIONS

Sann, "A review study on the benefits of multi-reader heads in SMR and TDMR systems", Data Storage Institute (DSI), Agency for Science, Technology and Research (A*STAR), Singapore, Oct. 2014, 5 pages.

*Primary Examiner* — Wayne Young
*Assistant Examiner* — James L Habermehl

(57) ABSTRACT

Various embodiments provide the position error signal (PES) that is generated by the data read channel that uses internal signals such as analog-to-digital signals, recovered data bits and signals or other internal signals to determine read head off-track metrics. Several different metrics can be utilized including a normalized norm metric, a normalized cross correlation metric, and a cross correlation with detected data metric. These metrics can be utilized to determine off-track shift of one or more read heads such that the read head position can be corrected.

20 Claims, 12 Drawing Sheets

US 9,837,110 B1

DIGITAL DATA DRIVEN POSITION ERROR SIGNAL FOR MAGNETIC RECORDING

RELATED APPLICATIONS

This application is a continuation of U.S. Utility patent application Ser. No. 15/089,341, filed Apr. 1, 2016 which in turn claims priority to U.S. Provisional Patent Application Ser. No. 62/169,400 filed Jun. 1, 2015, the disclosures of which are incorporated by reference herein in their entirety.

BACKGROUND

The background description provided herein is for the purpose of generally presenting the context of the disclosure. Unless otherwise indicated herein, the approaches described in this section are not prior art to the claims in this application and are not admitted to be prior art by inclusion in this section.

As aerial densities continue to increase for magnetic data storage, track pitch, also known as width, decreases as well. It is therefore increasingly difficult for a servo control loop to keep a read head properly located on a single track during read and write operations. In some instances, a position error signal (PES) can be generated during operation and used in the servo control loop to adjust the head position, such as through a voice coil motor (VCM). As dimensions continue to shrink and storage densities increase, it becomes increasingly more important to maintain read heads in proper locations relative to an associated track.

SUMMARY

This summary is provided to introduce subject matter that is further described below in the Detailed Description and Drawings. Accordingly, this Summary should not be considered to describe essential features nor used to limit the scope of the claimed subject matter.

Various embodiments provide a position error signal (PES) that is generated by the data read channel that uses internal signals such as analog-to-digital signals, recovered data bits and signals or other internal signals to determine read head off-track metrics. Several different metrics can be utilized including a normalized norm metric, a normalized cross correlation metric, and a cross correlation with detected data metric. These metrics can be utilized to determine off-track shift of one or more read heads such that the read head position can be corrected.

BRIEF DESCRIPTION OF THE DRAWINGS

The details of one or more implementations are set forth in the accompanying figures and the detailed description below. In the figures, the left-most digit of a reference number identifies the figure in which the reference number first appears. The use of the same reference numbers in different instances in the description and the figures indicate like elements.

DETAILED DESCRIPTION

This disclosure describes apparatuses and techniques for providing a position error signal (PES) that is generated by the data read channel that uses internal signals such as analog-to-digital signals, recovered data bits and signals or other internal signals to determine read head off-track metrics. Several different metrics can be utilized including a normalized norm metric, a normalized cross correlation metric, and a cross correlation with detected data metric. These metrics can be utilized to determine off-track shift of one or more read heads such that the read head position can be corrected.

As context for the discussion of the inventive embodiments below, consider now some operational principles associated with magnetic data storage and the generation of position error signals (PES).

Figure 1:
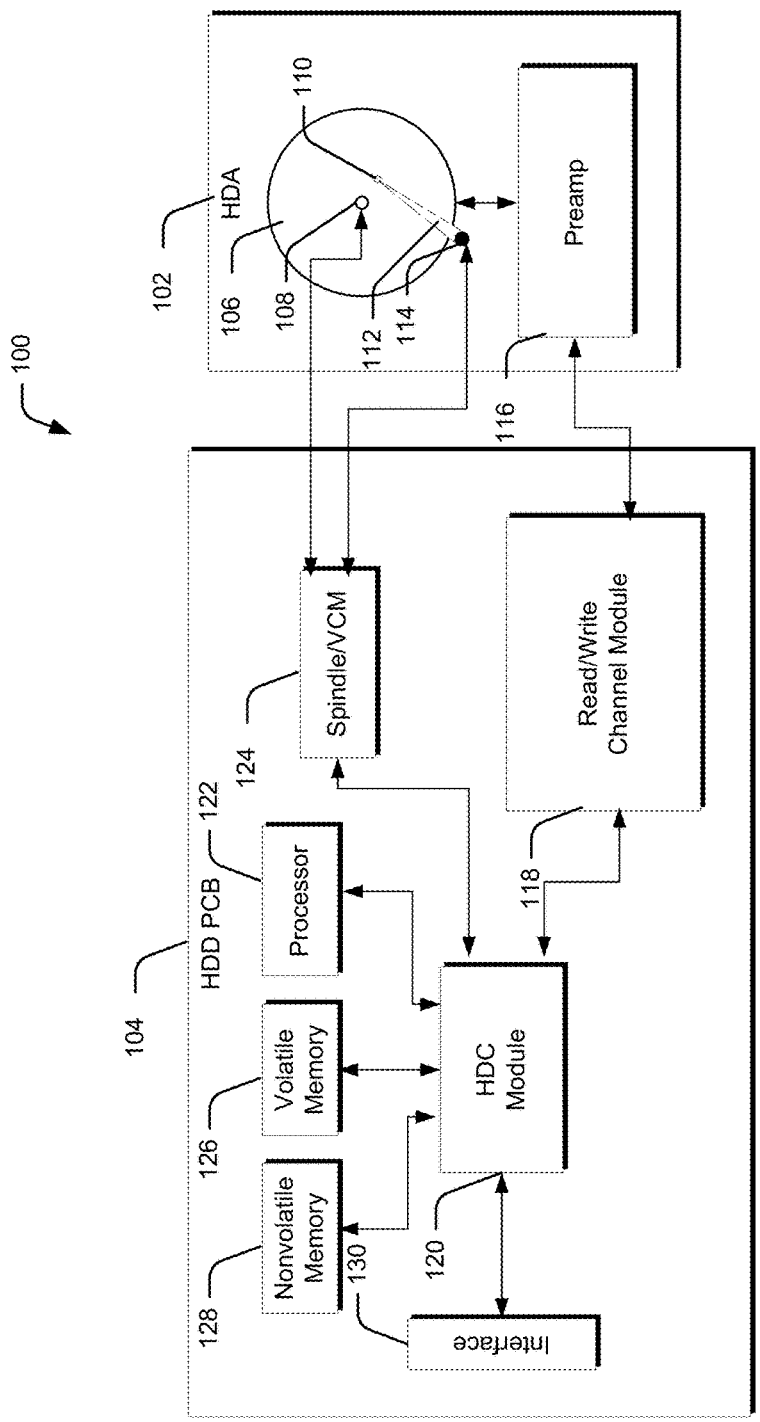
FIG. 1 is a block diagram of a hard disk drive.

In FIG. 1, a hard disk drive (HDD) system 100 includes a hard disk assembly (HDA) 102 and an HDD printed circuit board (PCB) 104. The HDA 102 includes one or more circular platters (i.e., disks) 106, which have magnetic surfaces that are used to store data magnetically. The platters 106 are arranged in a stack, and the stack is rotated by a spindle motor 108. At least one read/write head assembly (hereinafter, "head") 110 reads data from and writes data on the magnetic surfaces of the platters 106 in various implementations.

The head 110 includes a write head portion (or, "write head"), such as an inductor, that generates a magnetic field and a read head portion (or, "read head"), such as a magneto-resistive (MR) element, that senses the magnetic field on the platters 106. The head 110 is mounted at a distal end of an actuator arm 112. An actuator, such as a voice coil motor (VCM) 114, moves the actuator arm 112 relative to the platters 106.

The HDA 102 includes a preamplifier 116 that amplifies signals received from and sent to the head 110. The preamplifier 116 generates a write current that flows through the write head of the head 110 when writing data. The write current is used to produce a magnetic field on the magnetic surfaces of the platters 106. Magnetic surfaces of the platters 106 induce low-level analog signals in the read head of the head 110 during reading of the platters 106. The preamplifier 116 amplifies the low-level analog signals and outputs amplified analog signals to a read/write channel module 118.

The HDD PCB 104 includes the read/write channel module 118, a hard disk control (HDC) module 120, a processor 122, a spindle/VCM driver module 124, volatile memory 126, nonvolatile memory 128, and an input/output (I/O) interface 130.

During write operations, the read/write channel module 118 may encode the data to increase reliability by using error-correcting codes (ECC) such as a run length limited (RLL) code, a LDPC code, etc. The read/write channel module 118 then transmits the encoded data to the preamplifier 116. During read operations, the read/write channel module 118 receives analog signals from the preamplifier 116. The read/write channel module 118 converts the analog signals into digital signals, which are decoded to recover the original data.

The HDC module 120 controls operation of the HDD system 100. For example, the HDC module 120 generates commands that control the speed of the spindle motor 108 and the movement of the actuator arm 112. The spindle/VCM driver module 124 implements the commands and generates control signals that control the speed of the spindle motor 108 and the positioning of the actuator arm 112. Additionally, the HDC module 120 communicates with an external device (not shown), such as a host adapter within a host device, via the I/O interface 130. The HDC module 120 may receive data to be stored from the external device, and may transmit retrieved data to the external device.

The processor 112 processes data, and performs functions including encoding, decoding, filtering, and/or formatting. Additionally, the processor 112 processes servo or positioning information to position the head 110 over the platters 106 during read/write operations. Servo, which is stored on the platters 106, ensures that data is written to and read from correct locations on the platters 106. HDDs generate position feedback signals from special magnetic patterns called servo patterns that are written in designated areas on the disk surface known as servo sectors. The servo may be written as part of the manufacturing process and then never subsequently modified. The position feedback signals are called position error signals (PES). The closed-loop servomechanism decodes the position information written in these sectors to position the head at a desired position relative to the track being read.

Figure 2:
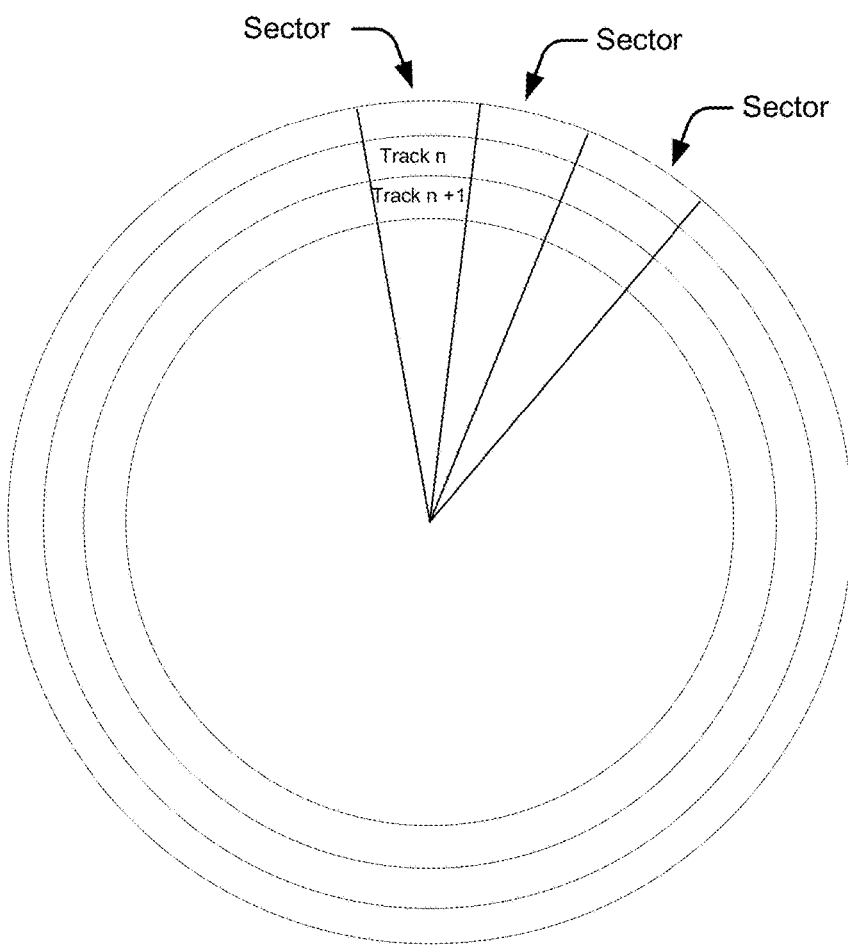
FIG. 2 illustrates tracks and sectors of a disk of a hard disk drive.

In FIG. 2, the HDD system 100 stores data on each of the platters 106 in concentric tracks, which are divided into sectors. The head 110 flies over the platters 106 and senses a magnetic field stored on the disk positioned over a certain track.

Figure 3:
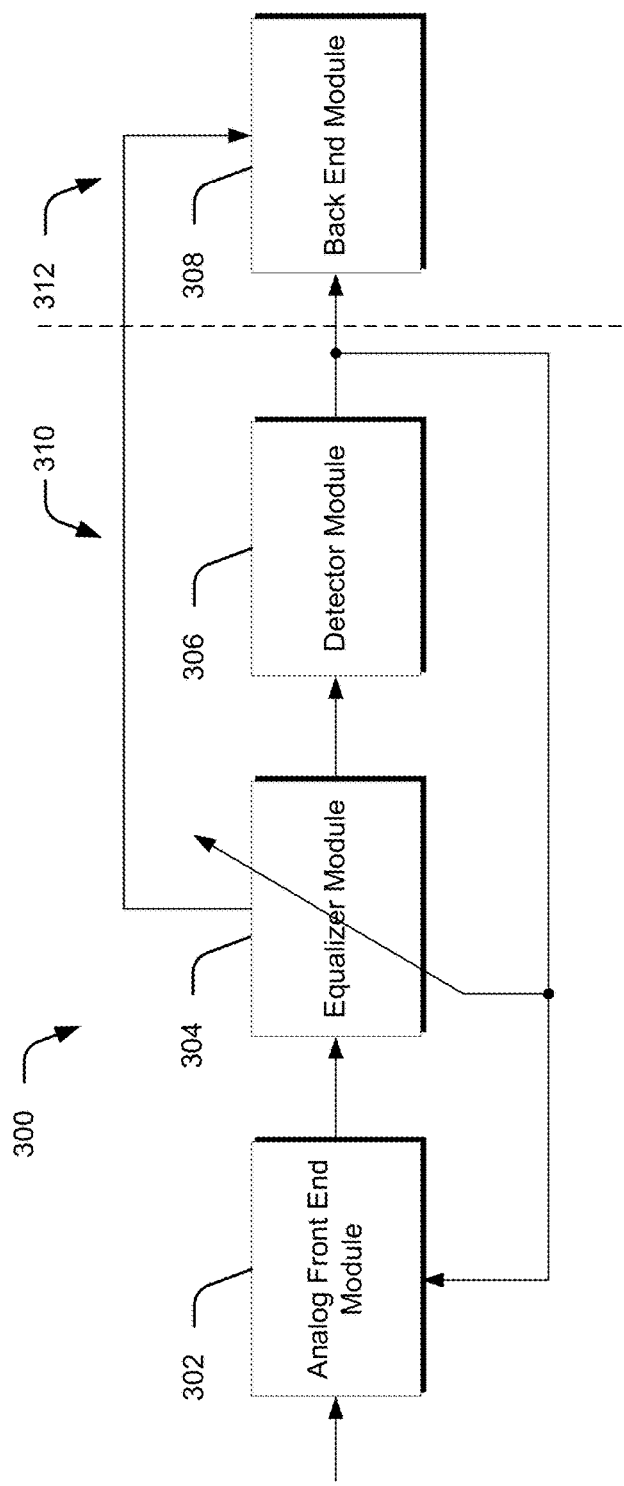
FIG. 3 illustrates a block diagram of an example read channel.

In FIG. 3, a receiver 300 includes an analog front end (AFE) module 302, an equalizer module 304, a detector module 306, and a back end module 308. A continuous-time signal is read from the disk and is processed by the AFE module 302. The AFE module 302 conditions and samples the continuous-time signal and outputs a discrete-time signal. The equalizer module 304 receives an output of the AFE module 302 and performs equalization to a predetermined target. A detector module 306 receives an output of the equalizer module and decodes data. For example only, the detector module 306 may include a sequence detector such as a Viterbi detector. An output of the detector module 306 is used to control the equalizer module 304 and control adaptation of the AFE module 302. Components of the receiver 300 up to and including the detector module 306 are identified in FIG. 3 as a front-end section 310 and components after the detector module 306 are identified in FIG. 3 as a back-end section 312.

A user data portion of the output of the equalizer module 304 is further processed by the back end module 308. The back end module 308 may perform more sophisticated detection and decoding for the purpose of error correction. The AFE module 302 performs automatic gain control (AGC) to adjust gain. The equalizer module 304 may also be adaptive. Adaptation in the AFE module 302 and the equalizer module 304 typically use minimum mean square error (MMSE) criteria.

For a given track, channel SNR can change from one sector to another sector due to variations in the signal or in the noise. For instance, the SNR changes with read head fly height (i.e., distance between head and platter). The SNR also changes with the amount of inter-track interference (ITI). While the AGC in the AFE module 302 and the equalizer module 304 are optimal or near optimal for the detector module 306, the output of the equalizer module 304 may not be the optimal for the back end section 308.

Figure 4:
FIG. 4 illustrates a representation of portions of data stored on two adjacent tracks.

In FIG. 4, for each data sector, preamble (PRE), syncmark (SM), user data (USERDATA) and post-amble (POST) fields are written on the disk. Two sectors are written on neighboring tracks from FIG. 2 and are identified as track n and track n+1. Typically, sectors on adjacent tracks are closely aligned. As the recording density increases, the distance between two neighboring tracks may decrease. When reading track n, the read head may also pick up a signal from one or more neighboring tracks—for example, track n+1. This phenomenon is called inter-track interference (ITI). The overall read-back signal may be modeled as the weighted sum of track n and track n+1 as set forth below:

$$r_n = (1-\alpha)y_n + \alpha y_{n+1}$$

where $r_n$ is the read-back signal, $y_n$ is the signal from track n, $y_{n+1}$ is the signal from track n+1, and $\alpha$ is an off-track percentage factor.

Figure 5:
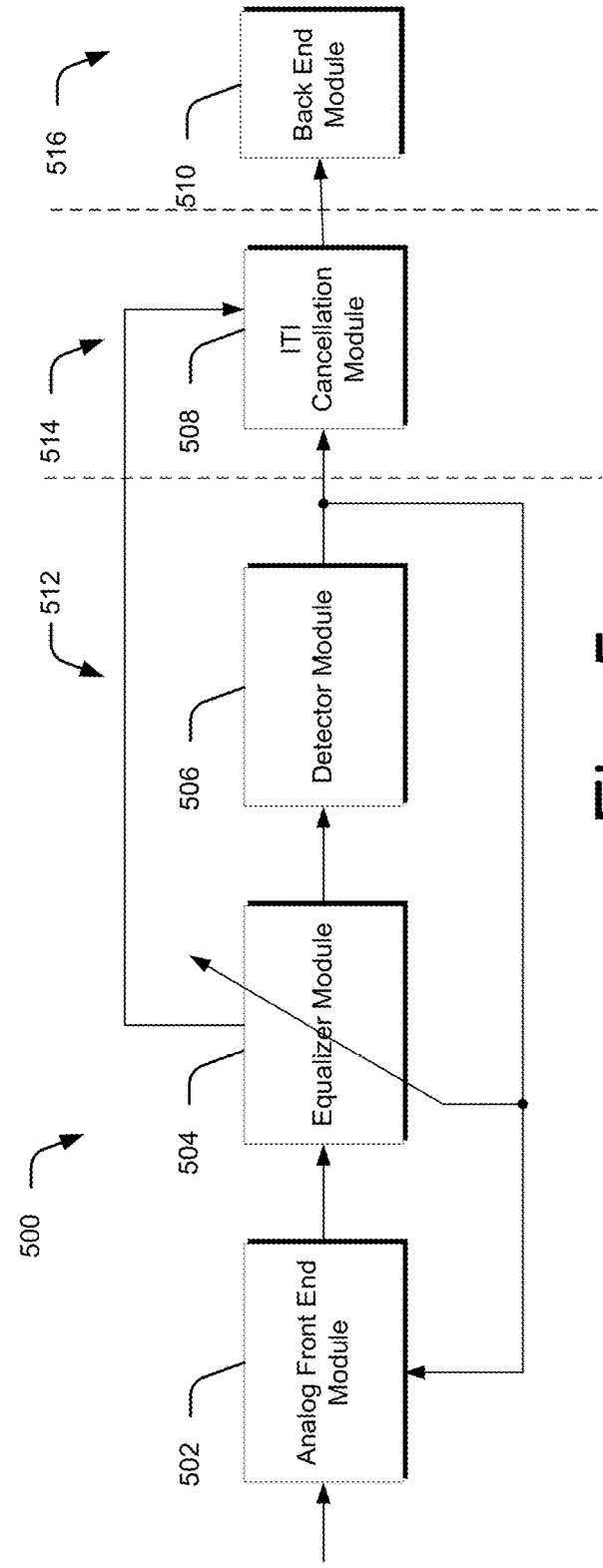
FIG. 5 illustrates a read channel having inter-track interference cancellation.

In FIG. 5, a receiver 500 with inter-track interference cancellation is shown. The inter-track interference cancellation may be applied as a post processing step. The receiver 500 includes an analog front end (AFE) module 502, an equalizer module 504, a detector module 506, an inter-track interference cancellation module 508 and a back end module 510. A front end section 512 includes the AFE module 502, the equalizer module 504, and the detector module 506. A post processing section 514 includes the inter-track interference cancellation module 508. A back end section 516 includes the back end module 5110. The inter-track interference cancellation module 508 treats inter-track interference as noise introduced in the front end section 512.

To more effectively combat inter-track interference, two or more read sensors may be used on a single head assembly. The multiple read sensors may provide signals that allow for the cancellation of inter-track interference components and/or the amplification of the desired read signal without amplifying the undesired inter-track interference.

While the platters are rotating, the amount of inter-track interference as the read head follows a track may indicate the position of the read head relative to the data track. The amount of inter-track interference may indicate how far off from the desired position the read head is and a corresponding position error signal (PES) can be generated. The position error signal can be used in the servo control loop to adjust the head (such as using a voice coil motor, as described above).

The position error signal may allow the track to be followed more accurately in between servo wedges. In addition or alternatively, the servo wedges may be included less frequently, thereby allowing more room for user data.

Figure 6:
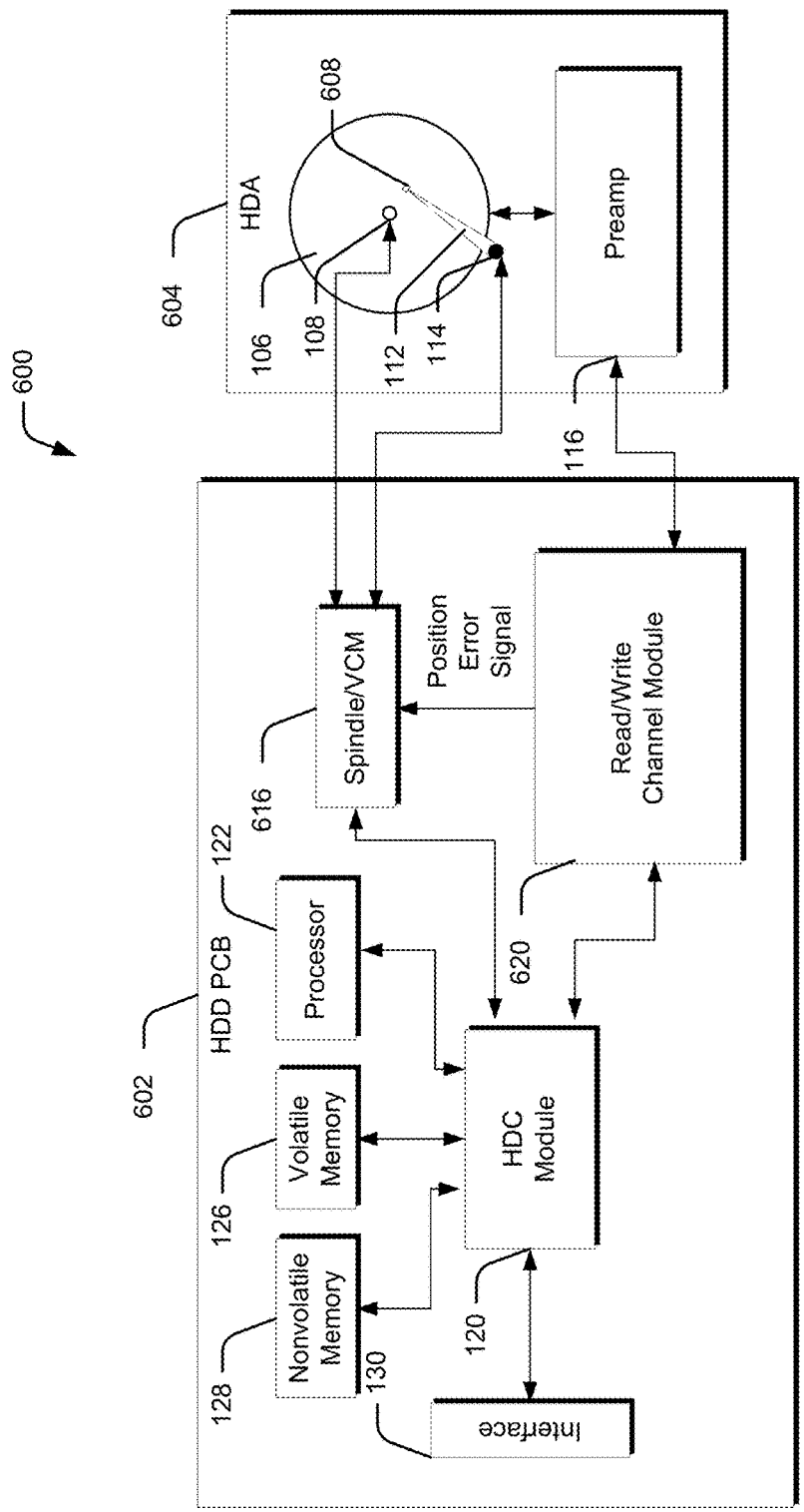
FIG. 6 illustrates a block diagram of a hard disk drive.

In FIG. 6, a hard disk drive (HDD) system 600 includes an HDD printed circuit board (PCB) 602 and a hard drive assembly (HDA) 604. Reference numerals from FIG. 1 are used to indicate similar elements. A head 608 (also called a head assembly) includes one or more read sensors as described in more detail below. A spindle/VCM (voice coil motor) driver module 616 controls an angle of the actuator arm 112 using the VCM 616. The angle controls the position of the head 608 over the platters 106 of the hard drive assembly 604.

A read/write channel module 620 communicates with the hard drive controller (HDC) module 120 and the pre-amp 116. The read/write channel module 620 may generate a position error signal (PES) that is provided to the spindle/VCM driver module 616 for controlling the angle of the actuator arm 112. The read/write channel module 620 may generate the position error signal based on a measurement of inter-track interference.

In one or more embodiments, an additional position error signal (PES) is generated and can be used by the servo controller for track following, as well as by the data channel to optimize 2D equalization in multisensor magnetic recording (MSMR), also known as two-dimensional magnetic recording (TDMR). In the described embodiments, the position error signal is generated by the data read channel that uses internal signals such as ADC signals, recovered data bits and signals or other internal signals to determine off-track metrics.

Figure 7:
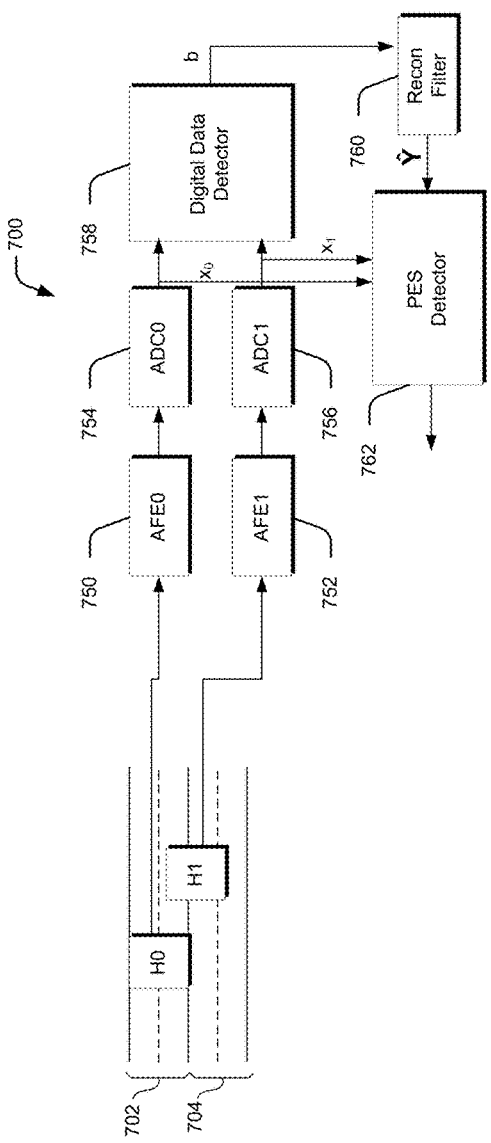
FIG. 7 illustrates a system including a position error signal (PES) detector.

FIG. 7 illustrates an example system in accordance with one or more embodiments generally at 700. In this example, the system includes multiple tracks two of which are shown at 702, 704 respectively. Each track includes a center which is indicated by the dashed line. The system includes a head assembly that has two read heads H0 and H1. It is to be appreciated and understood that the system may include more than two read heads and that the illustrated embodiment is for purposes of example. Accordingly, the head assembly may include three or more read heads without departing from the spirit and scope of the claimed subject matter. Head H0 is positioned to read data on track 702 and head H1 is positioned to read data on track 704. Notice that head H0 is centered on track 702, while head H1 is shifted slightly in the direction of track 702. This off-track shift will lead to interference during read operations. The embodiments described below use data from the read channel to generate one or more metrics that are then used to correct the off-track shift.

System 700 includes analog front ends 750, 752, each respectively connected to analog-to-digital converters 754, 756. The output of the analog-to-digital converters is provided to a digital data detector 758, as well as position error signal (PES) detector 762. The digital data detector 758 produces an output b which is provided to a reconstruction filter 760 whose output is provided to position error detector 762.

In operation, the analog front ends 750, 752 receive analog signals from read heads H0 and H1, respectively. The analog front ends provide analog data to each of the analog-to-digital converters 754, 756 which, in turn, provide respective digital data $x_0$ and $x_1$ to the digital data detector 758 and the position error detector 762. The digital data detector 758 processes the digital data that it receives to provide detected data b which is passed through the reconstruction filter. The detected data b constitutes the bits that are written to the media. The reconstruction filter essentially emulates the data channel and reconstructs a channel sample represented as $\hat{Y}$. The PES detector processes the reconstructed channel sample $\hat{Y}$, as well as the digital data $x_0$ and $x_1$ to provide a position error signal represented by the output arrow on PES detector 762. The position error signal can be used for various purposes, such as being provided to the spindle/VCM to control the actuator arm. This particular signal can be used for other purposes as well. For example, this signal can be used to inform the HDC module of how much off-track error there is so that in the case of a re-read due to failure, tracking can be adjusted for the re-read by measuring the off-track error. This signal can also be used to adjust the 2D equalizer coefficients to improve equalizing the signal based on the known off-track.

For purposes of the ongoing discussion, consider the following definitions:

ADC output: Let $x_i$ denote the ADC output from data path i;

Data bits: let b denote the detected data bits for the main track;

Reconstructed data signal: let $\hat{y}$ denote the reconstructed data signal for which detected data bits b are convolved with detector target G ($\hat{y}=b*G$)

In the illustrated example, the detector target is the equalization target used by the detector, as will be appreciated by the skilled artisan.

In the discussion that follows, the following constitute mathematical definitions of "norm" and "cross correlation" which are used to develop metrics that are utilized to determine an off-track amount for a particular read head:

$$\text{Norm: } \|x\| = \sqrt{\frac{1}{N}\sum_{i=1}^{N} x_i^2}$$

$$\text{Cross Correlation: } \langle x, y \rangle = \frac{1}{N}\sum_{i=1}^{N} x_i y_i$$

The norm constitutes the norm for an ADC sample using a number N of ADC samples for a particular data path. The cross correlation is computed for two ADC samples from different data paths. The number of samples N to use for the computation depends on the signal-to-noise ratio (SNR) and the required precision. With low SNR, a larger N is typically used to get a more accurate resolution. The norm and the cross correlation are then used to compute metrics associated with read head position and off-track shift, as will become apparent below.

Consider now a metric referred to as the "normalized norm" which constitutes but one way to use data read off the tracks to determine off-track shift.

Normalized Norm

In one or more embodiments, the norm of one signal is computed and is normalized by the sum of the norms of two signals including the one signal that was normalized. Mathematically, this can be represented as follows:

$$A_0 = \frac{\|x_0\|}{\|x_0\| + \|x_1\|}$$

In this example, the ADC signal is represented as a combination of data from two or more tracks as follows:

$$x_0 = \alpha_{-1} t_{n-1} + \alpha_0 t_n + \alpha_1 t_{n+1} + n_0$$

$$x_1 = \beta_{-1} t_{n-1} + \beta_0 t_n + \beta_1 t_{n+1} + n_1$$

In this example, $x_0$ and $x_1$ represent the ADC signal from a different track, and the signal for each track is denoted as $t_i$. Here, $t_n$ is the main track, $t_{n-1}$ is one of the adjacent tracks, and $t_{n+1}$ is the other of the adjacent tracks. The α and β coefficients represent the amount of signal each head picks up from each track, and n denotes noise components. Assuming that the data on the tracks are uncorrelated, then:

$$\|x_0\| = \sqrt{\alpha_{-1}^2 E_t + \alpha_0^2 E_t + \alpha_1^2 E_t} = \sqrt{E_t}\sqrt{\alpha_{-1}^2 + \alpha_0^2 + \alpha_1^2}$$
$$\|x_1\| = \sqrt{E_t}\sqrt{\beta_{-1}^2 + \beta_0^2 + \beta_1^2}$$

Where $E_t$ is the energy of the track data assumed to be the same for all tracks, so we get:

$$A_0 = \frac{\sqrt{\alpha_{-1}^2 + \alpha_0^2 + \alpha_1^2}}{\sqrt{\alpha_{-1}^2 + \alpha_0^2 + \alpha_1^2} + \sqrt{\beta_{-1}^2 + \beta_0^2 + \beta_1^2}}$$

We can then use $A_0$ and/or $A_1$ to determine the amount of off-track shift by comparing these values to values obtained in a calibration procedure in which the two values are measured for different amounts of known off-track shift, an example of which is provided below. For example, if the read head is completely on track, $\alpha_0=1$, $\alpha_{-1}=0$, and $\alpha_{-1}=0$. Otherwise, if there is some off-track amount, there are some small numbers distributed to each factor $\alpha$ which will lead to different ratios that can be compared to different known amounts of off-track shift.

Figure 8:
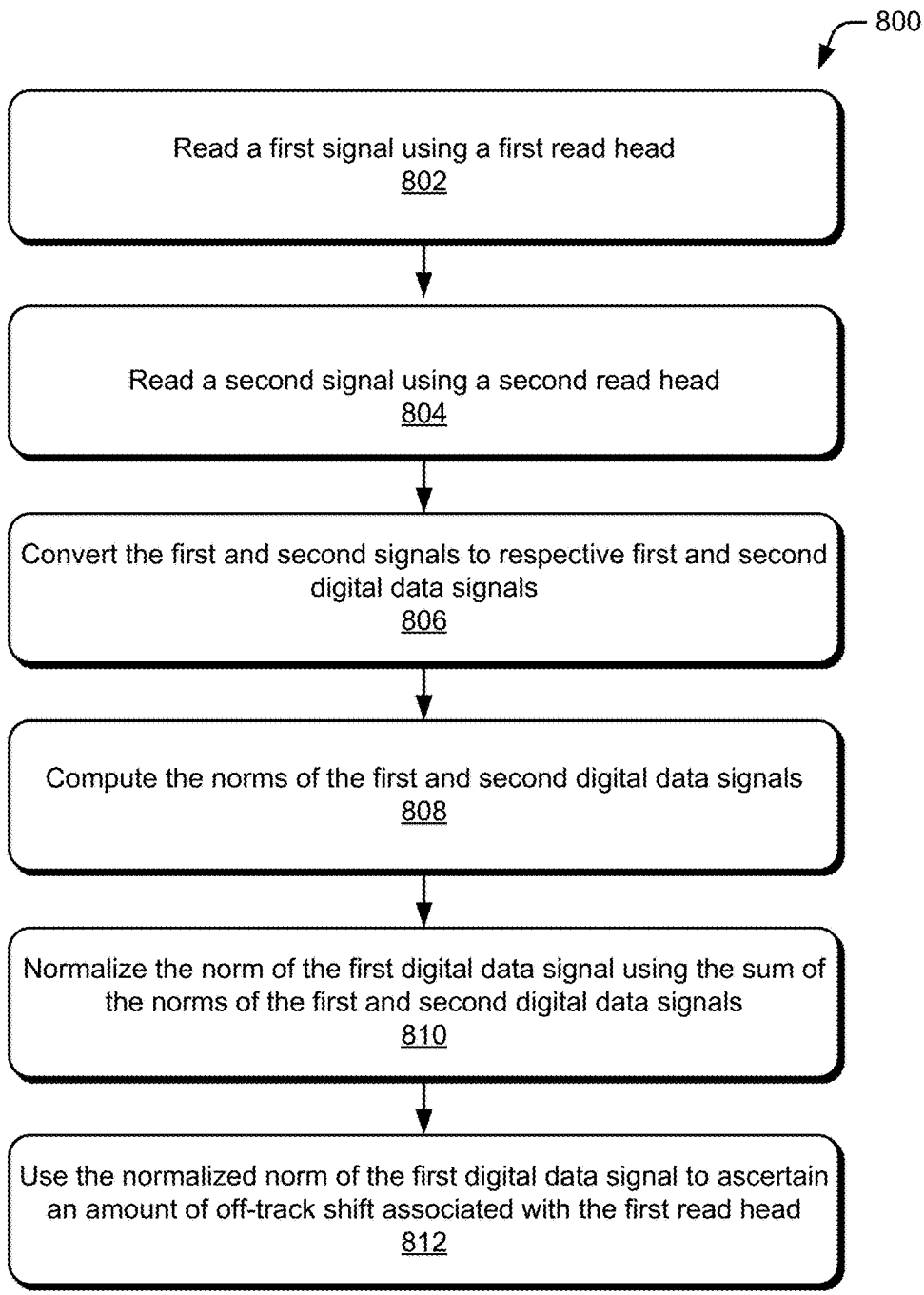
FIG. 8 is a flow diagram that describes steps in a method in accordance with one or more embodiments.

FIG. 8 depicts a method 800 for computing an amount of off-track shift using digital data produced by reading a magnetic recording medium using multiple read heads, in accordance with one or more embodiments.

At 802, a first signal is read using a first read head. The signal that is read constitutes an analog signal that is read from a magnetic recording medium. At 804, a second signal is read using a second read head. The signal also constitutes an analog signal that is read from the magnetic recording medium. At 806, the first and second signals are converted to respective first and second digital data signals. This can be done using an analog-to-digital converter in a system such as that described in FIG. 7. At 808, the norms of the first and second digital data signals are computed. Examples of how this can be done are provided above. At 810, the norm of the first digital data signal is normalized using the sum of the norms of the first and second digital data signals. At 812, the normalized norm of the first digital data signal is used to ascertain an amount of off-track shift associated with the first read head. This can be done by comparing the value of the normalized norm with values obtained in a calibration procedure in which values are obtained for different amounts of known off-track shift. Once the off-track shift is ascertained, the metric can be used to correct the off-track shift of at least one of the read heads.

Consider now another metric referred to as the "normalized cross correlation" which constitutes an additional way to use data read off the tracks to determine off-track shift.

Normalized Cross Correlation

In one or more embodiments, the amount of off-track shift is computed by first computing the cross correlation of two signals. Once the cross correlation of two signals has been computed, they can be normalized by the product of the two norms of each respective signal. Mathematically, this can be represented as follows:

$$A = \frac{\langle x_0, x_1 \rangle}{\|x_0\|\|x_1\|}$$

In this example, the ADC signal is again represented as a combination of data from two or more tracks as follows:

$$x_0 = \alpha_{-1}t_{n-1} + \alpha_0 t_n + \alpha_1 t_{n+1} + n_0$$

$$x_1 = \beta_{-1}t_{n-1} + \beta_0 t_n + \beta_1 t_{n+1} + n_1$$

As in the above example, $x_0$ and $x_1$ represent the ADC signal and the signal for each track is denoted as $t_i$. Here, $t_n$ is the main track, $t_{n-1}$ is one of the adjacent tracks, and $t_{n+1}$ is the other of the adjacent tracks. The $\alpha$ and $\beta$ coefficients represent the amount of signal each head picks up from each track, and n denotes noise components.

Note in this example how the cross correlation becomes:

$$\langle x_0, x_1 \rangle =$$
$$\langle (\alpha_{-1}t_{n-1} + \alpha_0 t_n + \alpha_1 t_{n+1} + n_0), (\beta_{-1}t_{n-1} + \beta_0 t_n + \beta_1 t_{n+1} + n_1) \rangle ==$$
$$E_t(\alpha_{-1}\beta_{-1} + \alpha_0\beta_0 + \alpha_1\beta_1)$$

One of the benefits of this approach is that it is independent of any gain changes in the signal path because a gain change on path 0 affects the numerator and denominator in the same way. The normalized cross correlation can then be used to ascertain an amount of off-track shift by comparing this value to other known values that have been calibrated for known degrees of off-shift.

Figure 9:
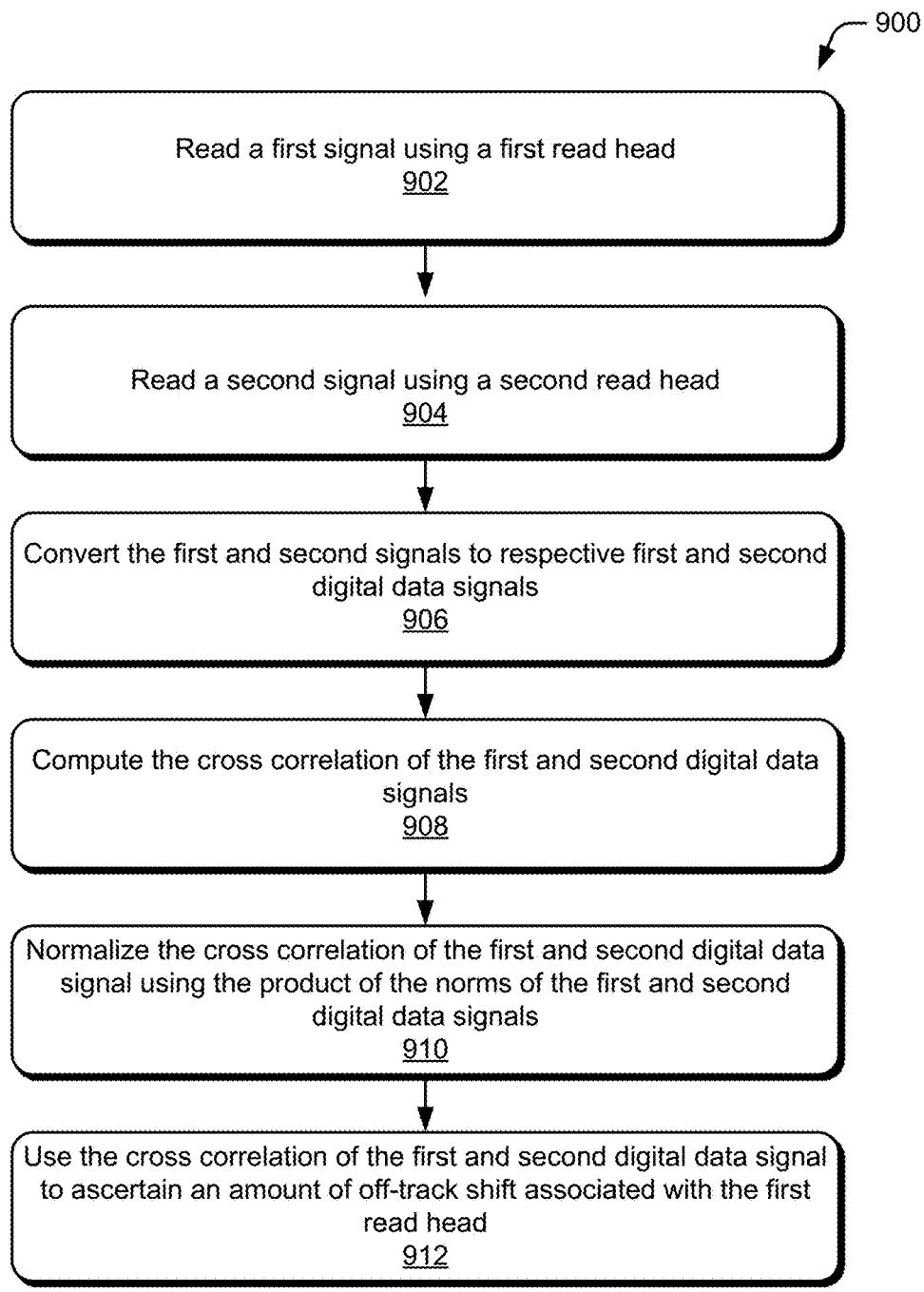
FIG. 9 is a flow diagram that describes steps in a method in accordance with one or more embodiments.

FIG. 9 depicts a method 900 for computing an amount of off-track shift using digital data produced by reading a magnetic recording medium using multiple read heads, in accordance with one or more embodiments.

At 902, a first signal is read using a first read head. The signal that is read constitutes an analog signal that is read from a magnetic recording medium. At 904, a second signal is read using a second read head. This signal also constitutes an analog signal that is read from the magnetic recording medium. At 906, the first and second signals are converted to respective first and second digital data signals. This can be done using an analog-to-digital converter in a system such as that described in FIG. 7. At 908, the cross correlation of the first and second digital data signals is computed. Examples of how this can be done are provided above. At 910, the cross correlation of the first and second digital data signal is normalized using the product of the norms of the first and second digital data signals. At 912, the cross correlation of the first and second digital data signal is used to ascertain an amount of off-track shift associated with the first read head. This can be done by comparing the value of the cross correlation with values obtained in a calibration procedure in which values are obtained for different amounts of known off-track shift. Once the off-track shift is ascertained, the metric can be used to correct the off-track shift of at least one of the read heads.

Consider now another metric referred to as "cross correlation with detected data."

Cross Correlation with Detected Data

In one or more embodiments, cross correlation with detected bits can be utilized to provide a metric from which off-track shift can be detected. As an example, consider the following. One can compute the cross correlation of the ADC output with reconstructed data $\hat{y}$ as follows:

$$\langle x_0, \hat{y} \rangle = \langle (\alpha_{-1}t_{n-1} + \alpha_0 t_n + \alpha_1 t_{n+1} + n_0), \hat{y} \rangle = \alpha_0 E[\hat{y}t_n]$$

This can provide the following metric that can be used to measure off-track shift:

$$A_0 = \frac{\langle x_0, \hat{y} \rangle}{\langle x_0, \hat{y} \rangle + \langle x_1, \hat{y} \rangle} = \frac{\alpha_0}{\alpha_0 + \beta_0}$$

However, a simpler calculation to provide the same metric can be used by using the detected bits b as follows:

$$A_0 = \frac{\langle x_0, b \rangle}{\langle x_0, b \rangle + \langle x_1, b \rangle} = \frac{\alpha_0}{\alpha_0 + \beta_0}$$

This metric is affected by the quality of the detected bits. If the quality is poor, correlation will be smaller.

Figure 10:
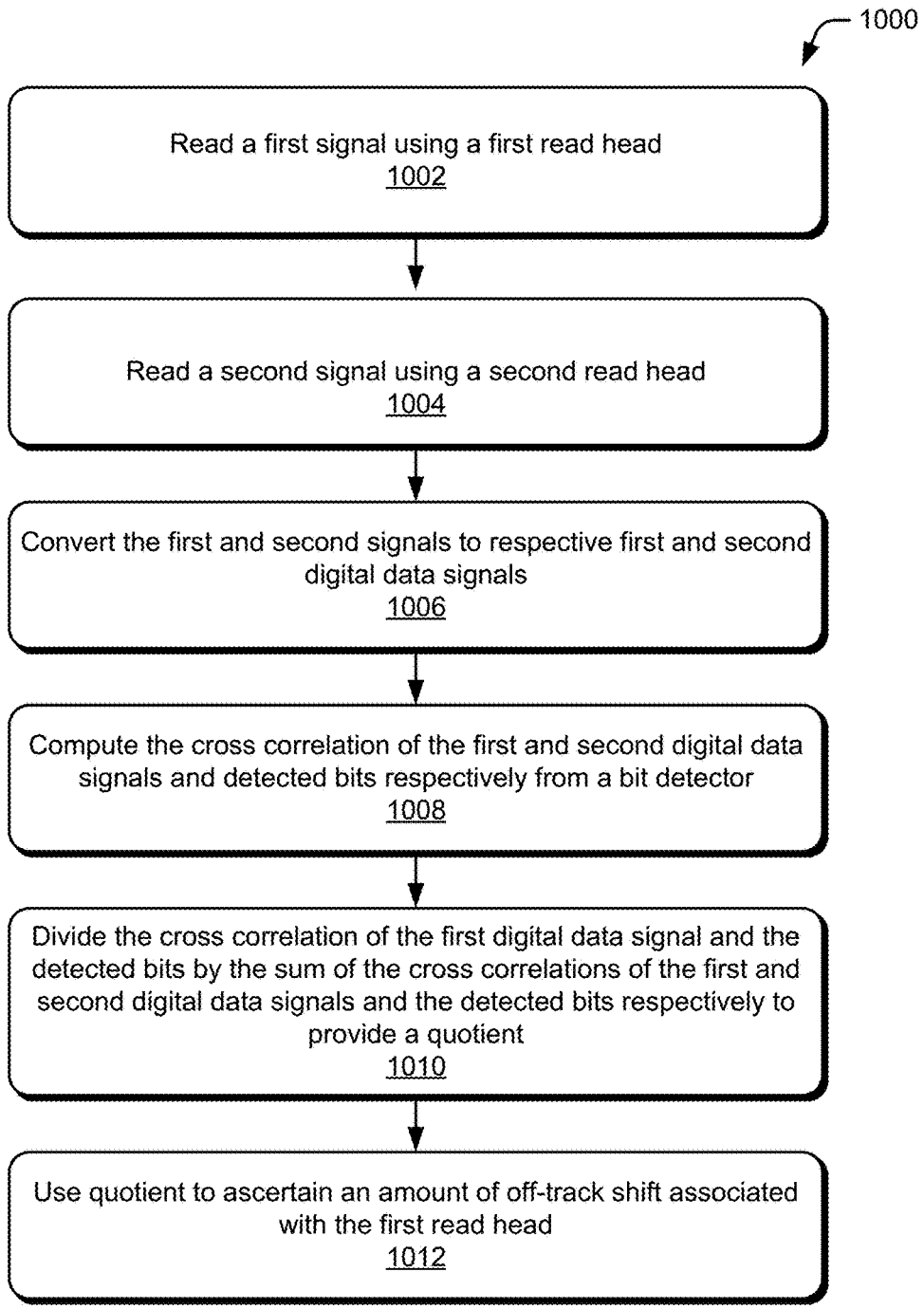
FIG. 10 is a flow diagram that describes steps in a method in accordance with one or more embodiments.

FIG. 10 depicts a method 1000 for computing an amount of off-track shift using digital data produced by reading a magnetic recording medium using multiple read heads, in accordance with one or more embodiments. At 1002, a first signal is read using a first read head. The signal that is read constitutes an analog signal that is read from a magnetic recording medium. At 1004, a second signal is read using a second read head. This signal also constitutes an analog signal that is read from the magnetic recording medium. At 1006, the first and second signals are converted to respective first and second digital data signals. This can be done using an analog-to-digital converter in a system such as that described in FIG. 7. At 1008, the cross correlation of the first and second digital data signals and detected bits from the first and second digital data signal, respectively, are computed. Examples of how this can be done are provided above. At 1010, the cross correlation of the first digital data signal and the detected bits are divided by the sum of the cross correlations of the first and second digital data signals and the detected bits respectively, to provide a quotient. At 1012, the quotient is used to ascertain an amount of off-track shift associated with the first read head. This can be done by comparing the value of the quotient with values obtained in a calibration procedure in which values are obtained for different amounts of known off-track shift. Once the off-track shift is ascertained, the metric can be used to correct the off-track shift of at least one of the read heads.

Figure 11:
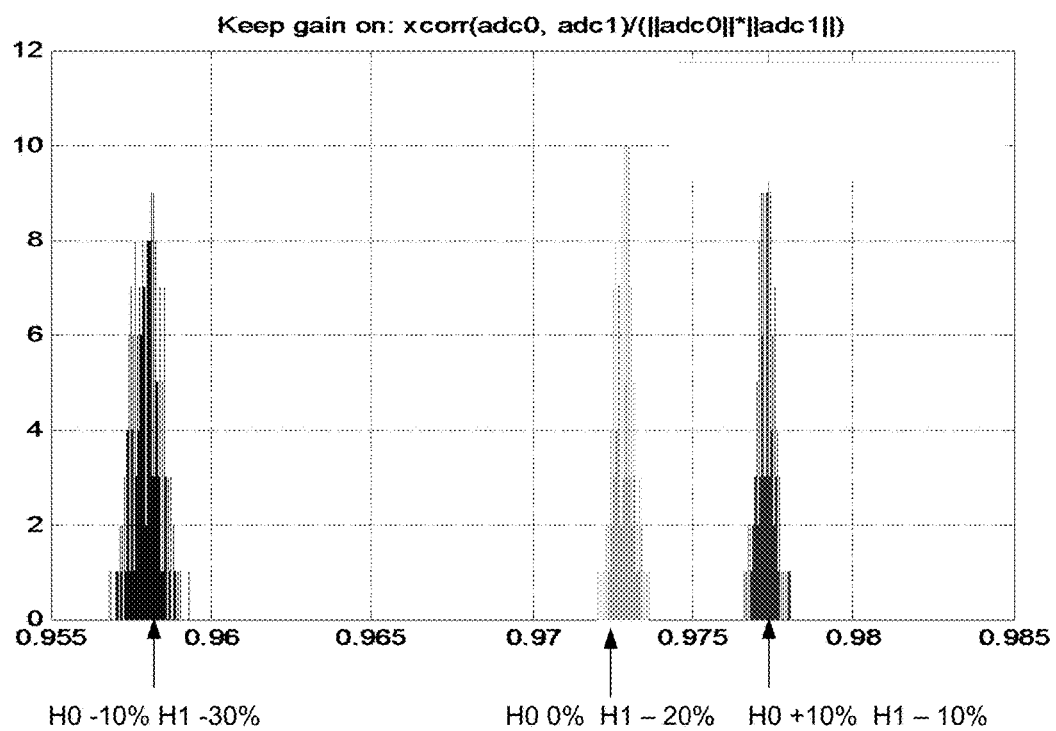
FIG. 11 illustrates example calibration data that can be used in connection with the inventive principles described herein.

With respect to a calibration procedure, consider the following. FIG. 11 illustrates calibration data in the form of histograms obtained for three different off-track positions. In this case, the figure reflects the results for cross correlation of the ADC output with different locations relative to the center track. By finding the mean for each head location, one can use the new measurement and determine the off-track by comparing to the calibrated means.

The following discussion describes an operating environment and a System-on-Chip (SoC) in which components described above can be embodied. In the discussion below, reference is made to the operating environment by way of example only.

Operating Environment

Figure 12:
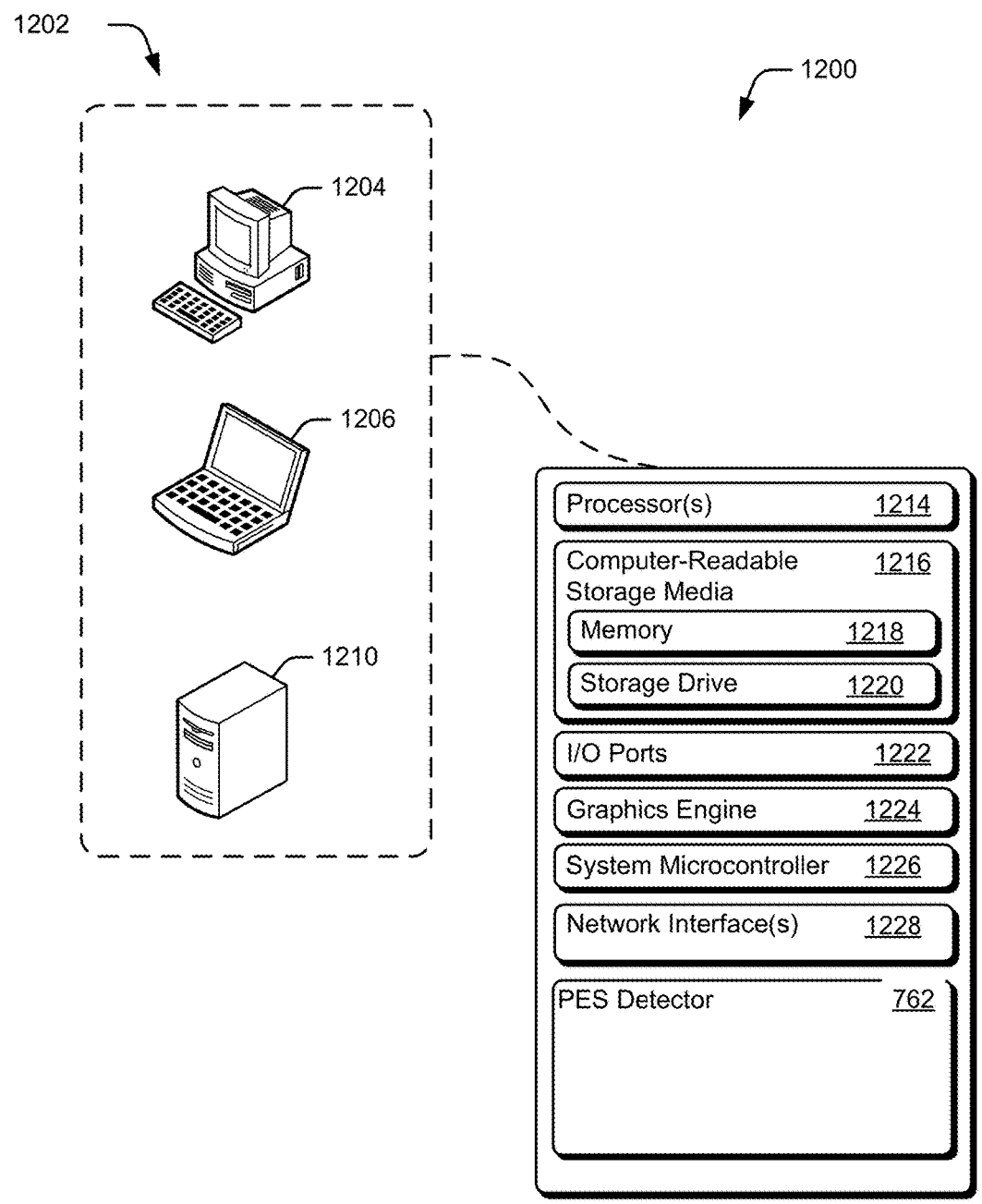
FIG. 12 illustrates an example operating environment in accordance with one or more embodiments.

FIG. 12 illustrates an example operating environment in accordance with one or more embodiments generally at 1200. The environment can include multiple types of devices 1202 that can use the inventive principles described herein.

Devices 1202 can include desktop computer 1204, laptop computer 1206, server 1210, as well as a variety of other devices.

Each device 1202 includes processor(s) 1214 and computer-readable storage media 1216. Computer-readable storage media 1216 may include any type and/or combination of suitable storage media, such as memory 1218 and storage drive(s) 1220. Memory 1218 may include memory such as dynamic random-access memory (DRAM), static random access memory (SRAM), read-only memory (ROM), or Flash memory (not shown) useful to store data of applications and/or an operating system of the device 1202. Storage drive(s) 1220 may include hard disk drives and/or solid-state drives (not shown) useful to store code or instructions associated with an operating system and/or applications of device. Processor(s) 1214 can be any suitable type of processor, either single-core or multi-core, for executing instructions or commands of the operating system or applications stored on storage drive(s) 1220.

Devices 1202 can also each include I/O ports 1222, graphics engine 1224, system microcontroller 1226, network interface(s) 1228, and a PES detector 762 that operates as described above and below.

I/O ports 1222 allow device 1202 to interact with other devices and/or users. I/O ports 1222 may include any combination of internal or external ports, such as audio inputs and outputs, USB ports, Serial ATA (SATA) ports, PCI-express based ports or card-slots, and/or other legacy ports. I/O ports 1222 may also include or be associated with a packet-based interface, such as a USB host controller, digital audio processor, or SATA host controller. Various peripherals may be operatively coupled with I/O ports 1222, such as human-input devices (HIDs), external computer-readable storage media, or other peripherals.

Graphics engine 1224 processes and renders graphics for device 1202, including user interface elements of an operating system, applications, command interface, or system administration interface. System microcontroller 1226 manages low-level system functions of device 1202. Low-level system functions may include power status and control, system clocking, basic input/output system (BIOS) functions, switch input (e.g. keyboard and button), sensor input, system status/health, and other various system "housekeeping" functions. Network interface(s) 1222 provides connectivity to one or more networks PES detector is representative of functionality that enables position error signals to be generated from data that is read from a magnetic recording media as described above.

Having considered the above embodiments, consider now a system-on-a-chip that can be utilized in accordance with one or more embodiments.

System-On-Chip

Figure 13:
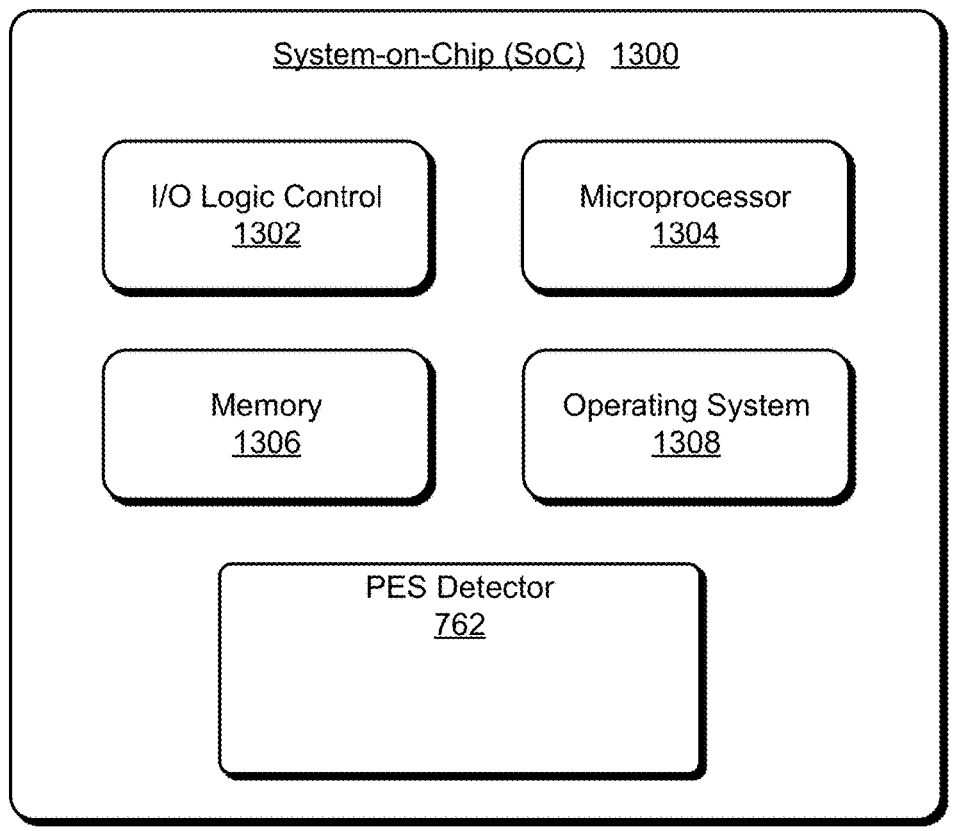
FIG. 13 illustrates a System-on-Chip (SoC) environment for implementing aspects of the techniques described herein.

FIG. 13 illustrates a System-on-Chip (SoC) 1300, which can implement various embodiments described above. A SoC can be implemented in any suitable device that utilizes magnetic recording media and position error signals (PES) to correct off-track read head positions.

SoC 1300 can be integrated with electronic circuitry, a microprocessor, memory, input-output (I/O) logic control, communication interfaces and components, other hardware, firmware, and/or software needed to provide communicate coupling for a device, such as any of the above-listed devices. SoC 1300 can also include an integrated data bus (not shown) that couples the various components of the SoC for data communication between the components. A wireless communication device that includes SoC 1300 can also be implemented with many combinations of differing components. In some cases, these differing components may be configured to implement concepts described herein over a wireless connection or interface.

In this example, SoC 1300 includes various components such as an input-output (I/O) logic control 1302 (e.g., to include electronic circuitry) and a microprocessor 1304 (e.g., any of a microcontroller or digital signal processor). SoC 1300 also includes a memory 1306, which can be any type of RAM, SRAM, low-latency nonvolatile memory (e.g., flash memory), ROM, and/or other suitable electronic data storage. SoC 1300 can also include various firmware and/or software, such as an operating system 1308, which can be computer-executable instructions maintained by memory 1306 and executed by microprocessor 1304. SoC 1300 can also include other various communication interfaces and components, communication components, other hardware, firmware, and/or software.

SoC 1300 includes position error signal detector 762 that operates as described above.

CONCLUSION

Various embodiments provide the position error signal (PES) that is generated by the data read channel that uses internal signals such as analog-to-digital signals, recovered data bits and signals or other internal signals to determine read head off-track metrics. Several different metrics can be utilized including a normalized norm metric, a normalized cross correlation metric, and a cross correlation with detected data metric. These metrics can be utilized to determine off-track shift of one or more read heads such that the read head position can be corrected.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method comprising:
reading, via a first read head, a first analog signal off a magnetic recording medium;
reading, via a second read head, a second analog signal off the magnetic recording medium;
converting, via a first analog-to-digital converter, the first analog signal to a first digital signal;
converting, via a second analog-to-digital converter, the second analog signal to a second digital signal; and
processing, via a position error detection module, the first digital signal and the second digital signal to provide a metric useful to correct off-track shift of the first read head or off-track shift of the second read head, the processing comprising at least one of:
(i) computing a norm of the first digital signal and computing a norm the second digital signal;
(ii) computing a cross-correlation of the first digital signal and the second digital signal; or
(iii) using bits detected based on the first digital signal and the second digital signal.

2. The method as recited in claim 1, further comprising:
correcting, based on the metric, off-track shift of the first read head; or
correcting, based on the metric, off-track shift of the second read head.

3. The method as recited in claim 1, further comprising using the metric to correct the off-track shift of the first read head or to correct the off-track shift of the second read heads by comparing the metric to a reference value obtained in a calibration procedure in which the reference value is obtained for a known amount of off-track shift.

4. The method as recited in claim 1, wherein the processing comprises computing the norm of the first digital signal and the norm of the second digital signal and the processing further comprises:
normalizing the norm of the first digital signal by a sum of the respective norms of the first digital signal and second digital signal to provide a normalized norm of the first digital signal; or
normalizing the norm of the second digital signal by the sum of the respective norms of the first digital signal and second digital signal to provide a normalized norm of the second digital signal.

5. The method as recited in claim 1, wherein the processing comprises computing the cross-correlation of the first digital signal and the second digital signal and the processing further comprises:
computing the norm of the first digital signal;
computing the norm of the second digital signal; and
normalizing the cross-correlation of the first digital signal and second digital signal with a product of the norm of the first digital signal and the norm of the second digital signal.

6. The method as recited in claim 1, wherein the metric is independent of a gain change between respective signal paths associated with the first analog signal and the second analog signal.

7. The method as recited in claim 1, wherein the magnetic recording medium is a multi-track magnetic recording medium, the first analog signal is read off a first track of the multi-track magnetic recording medium via the first read head, and the second analog signal is read off a second track of the multi-track magnetic recording medium via the second read head.

8. A system comprising:
a first analog front-end module configured to receive a first analog signal read from a magnetic recording medium by a first read head;
a second analog front-end module configured to receive a second analog signal from the magnetic recording medium by a second read head;
a first analog-to-digital module configured to convert the first analog signal to a first digital signal;
a second analog-to-digital module configured to convert the second analog signal to a second digital signal; and
a position error signal (PES) module configured to process the first digital signal and the second digital signal to provide a metric useful to correct off-track shift of the first read head or off-track shift of the second read head, the PES module configured to process the first digital signal and the second digital signal by at least one of:
(i) computing a norm of the first digital signal and computing a norm the second digital signal;
(ii) computing a cross-correlation of the first digital signal and the second digital signal; or
(iii) using bits detected based on the first digital signal and the second digital signal.

9. The system as recited in claim 8, wherein the PES module is further configured to:
correct, based on the metric, off-track shift of the first read head; or
correct, based on the metric, off-track shift of the second read head.

10. The system as recited in claim 8, wherein the PES module is further configured to use the metric to correct the off-track shift of the first read head or to correct the off-track shift of the second read heads by comparing the metric to a reference value obtained in a calibration procedure in which the reference value is obtained for a known amount of off-track shift.

11. The system as recited in claim 8, wherein:
the PES module computes the norm of the first digital signal and the norm of the second digital signal, and the PES module is further configured to:

normalize the norm of the first digital signal by a sum of the respective norms of the first digital signal and second digital signal to provide a normalized norm of the first digital signal; or normalize the norm of the second digital signal by the sum of the respective norms of the first digital signal and second digital signal to provide a normalized norm of the second digital signal.

12. The system as recited in claim 8, wherein the PES module computes the cross-correlation of the first digital signal and the second digital signal and the PES module is further configured to:

compute the norm of the first digital signal;

compute the norm of the second digital signal; and normalize the cross-correlation of the first digital signal and second digital signal with a product of the norm of the first digital signal and the norm of the second digital signal.

13. The system as recited in claim 8, wherein the metric is independent of a gain change between respective signal paths associated with the first analog signal and the second signal.

14. The system as recited in claim 8, wherein:

the first analog front-end module is further configured to sample the first analog signal to provide a discrete-time signal to the first analog-to-digital module; or the second analog front-end module is further configured to sample the second analog signal to provide a discrete-time signal to the second analog-to-digital module.

15. A System-on-Chip comprising:

a signal interface to a magnetic recording medium assembly, the signal interface configured to receive at least:

a first analog signal read from a magnetic recording medium by a first read head;

a second analog signal read from the magnetic recording medium by a second read head;

a read channel module that includes:

a first analog-to-digital module configured to convert the first analog signal read from the magnetic recording medium to a first digital signal;

a second analog-to-digital module configured to convert the second analog signal read from the magnetic recording medium to a second digital signal; and a position error signal (PES) module that is configured to process the first digital signal and the second digital signal to provide a metric useful to correct off-track shift of the first read head or off-track shift of the second read head, the PES module configured to process the first digital signal and the second digital signal by at least one of:

(i) computing a norm of the first digital signal and computing a norm the second digital signal;

(ii) computing a cross-correlation of the first digital signal and the second digital signal; or (iii) using bits detected based on the first digital signal and the second digital signal.

16. The System-on-Chip as recited in claim 15, wherein the PES module is further configured to:

correct, based on the metric, off-track shift of the first read head; or correct, based on the metric, off-track shift of the second read head.

17. The System-on-Chip as recited in claim 15, wherein the PES module is further configured to use the metric to correct the off-track shift of the first read head or to correct the off-track shift of the second read heads by comparing the metric to a reference value obtained in a calibration procedure in which the reference value is obtained for a known amount of off-track shift.

18. The System-on-Chip as recited in claim 15, wherein the PES module computes the cross-correlation of the first digital signal and the second digital signal and the PES module is further configured to:

compute the norm of the first digital signal;

compute the norm of the second digital signal; and normalize the cross-correlation of the first digital signal and second digital signal with a product of the norm of the first digital signal and the norm of the second digital signal.

19. The System-on-Chip as recited in claim 15, wherein:

the PES module computes the norm of the first digital signal and the norm of the second digital signal, and the PES module is further configured to:

normalize the norm of the first digital signal by a sum of the respective norms of the first digital signal and second digital signal to provide a normalized norm of the first digital signal; or normalize the norm of the second digital signal by the sum of the respective norms of the first digital signal and second digital signal to provide a normalized norm of the second digital signal.

20. The System-on-Chip as recited in claim 15, wherein the System-on-Chip and magnetic recording medium are embodied in whole or part as a magnetic recording medium-based storage drive or magnetic recording medium-based storage device.

* * * * *